(12) United States Patent
Wixted et al.

(10) Patent No.: US 7,055,833 B2
(45) Date of Patent: Jun. 6, 2006

(54) COMPUTER STORAGE CART

(75) Inventors: Brian J. Wixted, Crystal Lake, IL (US); Matthew E. Petrick, Oak Park, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 10/059,862

(22) Filed: Jan. 29, 2002

(65) Prior Publication Data

US 2003/0141687 A1 Jul. 31, 2003

(51) Int. Cl.
    B62B 3/00 (2006.01)
(52) U.S. Cl. .................. 280/47.34; 312/223.6
(58) Field of Classification Search ............ 280/47.34, 280/47.35, 35, 651; 320/105, 107, 111; 312/223.1, 312/223.2, 223.6, 114, 244; 211/26; 108/50.02
    See application file for complete search history.

(56) References Cited

U.S. PATENT DOCUMENTS

| | | | | |
|---|---|---|---|---|
| 1,252,287 A | * | 1/1918 | Mifflin | 312/123 |
| 1,454,033 A | | 5/1923 | Baird | |
| 1,484,397 A | | 2/1924 | Johnson | |
| 1,732,346 A | | 10/1929 | Waller | |
| 1,750,440 A | * | 3/1930 | Tarver | 312/100 |
| 3,733,836 A | | 5/1973 | Corini | |
| 3,965,969 A | * | 6/1976 | Williamson | 165/267 |
| 4,167,983 A | | 9/1979 | Seider et al. | |
| 4,316,078 A | | 2/1982 | Mack et al. | |
| 4,660,902 A | * | 4/1987 | Resendez, Jr. | 312/114 |
| 4,669,790 A | | 6/1987 | Briggs | |
| 4,718,741 A | * | 1/1988 | Nichoalds | 312/223.6 |
| 4,922,721 A | | 5/1990 | Robertson et al. | |
| 4,930,047 A | * | 5/1990 | Peterson | 361/736 |
| 5,022,720 A | * | 6/1991 | Fevig et al. | 312/223.5 |
| 5,039,929 A | | 8/1991 | Veistroffer et al. | |
| 5,056,331 A | | 10/1991 | Lotz | |
| 5,071,367 A | * | 12/1991 | Luu | 439/501 |
| 5,096,195 A | | 3/1992 | Gimmon | |
| 5,142,910 A | | 9/1992 | Litchman | |
| 5,210,603 A | | 5/1993 | Sabin | |
| 5,372,075 A | * | 12/1994 | Graf | 108/180 |
| 5,448,945 A | | 9/1995 | Taylor et al. | |
| 5,611,553 A | * | 3/1997 | Schoeman et al. | 280/47.35 |
| 5,642,898 A | | 7/1997 | Wise | |
| 5,852,332 A | | 12/1998 | Shearer | |
| 5,997,928 A | | 12/1999 | Kaish et al. | |
| 6,000,486 A | | 12/1999 | Romick et al. | |
| 6,008,621 A | * | 12/1999 | Madison et al. | 320/107 |
| 6,113,198 A | * | 9/2000 | Hommes | 312/114 |
| 6,135,706 A | | 10/2000 | Marti et al. | |
| 6,218,796 B1 | * | 4/2001 | Kozlowski | 318/280 |
| 6,315,337 B1 | * | 11/2001 | Lewis | 292/285 |
| 6,409,187 B1 | * | 6/2002 | Crow, Jr. | 280/47.34 |

OTHER PUBLICATIONS

Highsmith, Inc. Catalog, 1997.*
www.877mobilan.com, Aug. 1, 2001.*

* cited by examiner

Primary Examiner—Christopher P. Ellis
Assistant Examiner—Christopher Bottorff
(74) Attorney, Agent, or Firm—Welsh & Katz, Ltd.

(57) ABSTRACT

An improved computer storage cart is provided which comprises an interior space defined by a top portion and a bottom portion joined to spaced apart opposing sidewalls and a back portion. Further, a plurality of vertically spaced apart shelves are located in the interior space for holding the computers or other rechargeable equipment. One or more doors are provided to secure the interior space and one or more electrical units having one or more electrical receptacles are positioned adjacent the shelves and proximate at least one door.

21 Claims, 7 Drawing Sheets

FIG. 12 ated into top 16.

COMPUTER STORAGE CART

FIELD OF THE INVENTION

The present invention relates to computer storage carts, and more particularly to computer storage carts that provide for a source of power conveniently located within the cart.

BACKGROUND OF THE INVENTION

Storage carts of various types are well known in the art. Such devices are typically used to store items inside of the carts. Some of the carts known in the art have legs and some of the carts have wheels to provide for ease of transport of the cart from location to location. Some storage carts are used to store computers such as, for example, laptop and notebook computers. Found on some of the computer storage carts used to store laptop or notebook computers is a source of power located within or near the cart in order to provide for the computer's batteries to be recharged while the computers are stored within the cart.

However, previous computer storage carts have some inherent disadvantages. One of the disadvantages with existing computer storage carts is that they do not provide a source of power that is easily accessible by a user. Some of the existing carts have the source of power located to the rear of the cart. Other carts have the source of power located on a bottom shelf of the cart. These locations are not easily accessible by users of the cart and make it difficult for a user to insert a computer's recharging cord into the appropriate power supply. The present invention overcomes these and other problems inherent in existing computer storage carts.

The present invention provides a computer storage cart that allows users to easily access the cart's power source to enable a user to quickly insert the computer's charging cord into the appropriate power supply of the cart. The present invention provides electrical units containing multiple outlets where the electrical units are conveniently located in front of the cart's storage shelves where they are easily accessible by a user.

The principal object of the present invention is to provide an improved computer storage cart that has a conveniently located and accessible source of power in the front portion of the cart.

Another object of the present invention is to provide a novel computer storage cart that can securely store laptop and notebook computers.

Still another object of the present invention is to provide a novel computer storage cart which can be locked.

A further object of the present invention is to provide a novel computer storage cart which can be easily moved from location to location.

A further object of the present invention is to provide a novel computer storage cart which is simple in design and inexpensive to construct, and is durable and rugged in structure.

Still further objects and advantages will become apparent from a consideration of the ensuing description and drawings of the invention.

BRIEF SUMMARY OF THE INVENTION

These and other objects are achieved by a computer storage cart of the present invention. In one form of the invention, a computer storage cart is provided which comprises an interior space defined by a top portion and a bottom portion joined to spaced apart opposing sidewalls and a back portion. Further, a plurality of vertically spaced apart shelves are located in the interior space for holding the computers or other rechargeable equipment. One or more doors are provided to secure the interior space and one or more electrical units having one or more electrical receptacles are positioned adjacent the shelves and proximate at least one door.

DETAILED DESCRIPTION OF THE INVENTION

Figure 1:
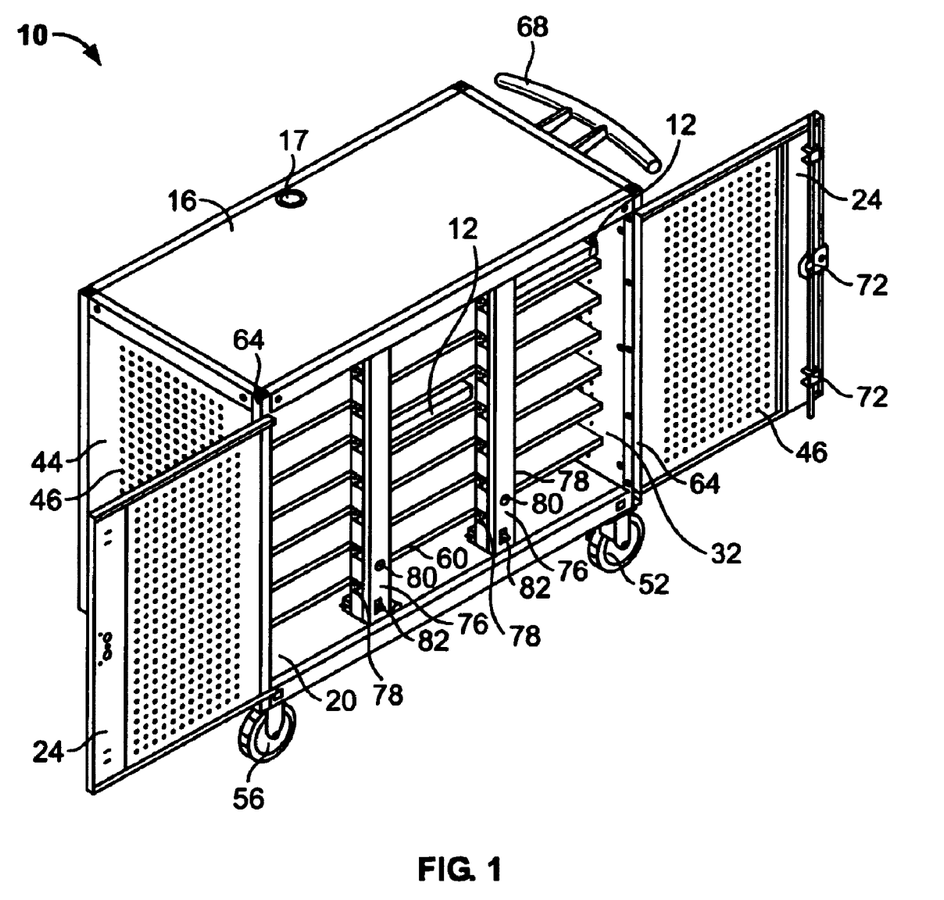
FIG. 1 is a front perspective view of one embodiment of the computer storage cart of the present invention.
Figure 2:
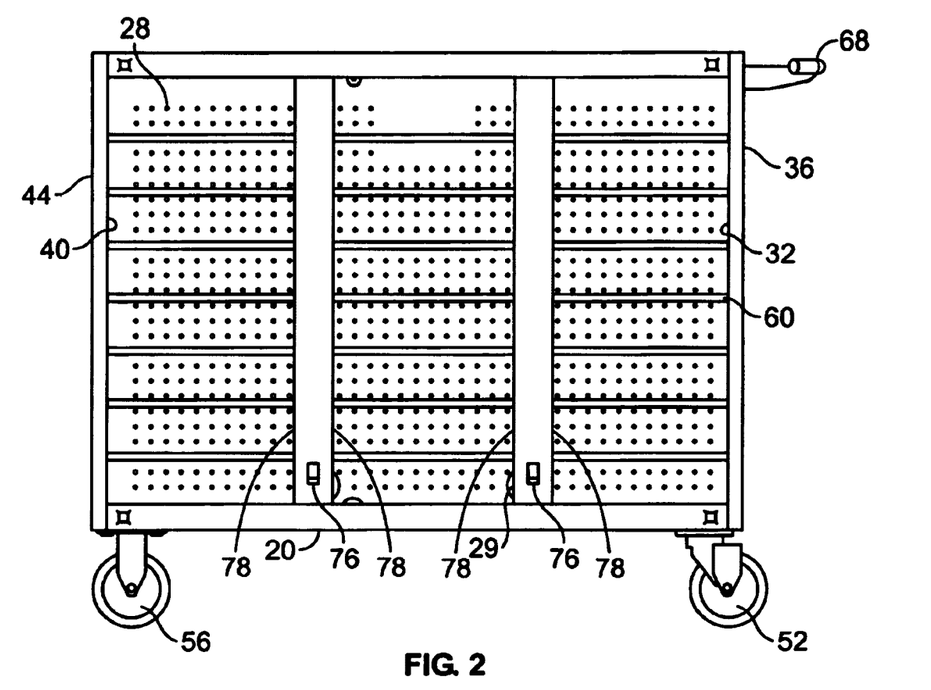
FIG. 2 is front view of the computer storage cart of FIG. 1 shown with the doors removed for clarity.
Figure 3:
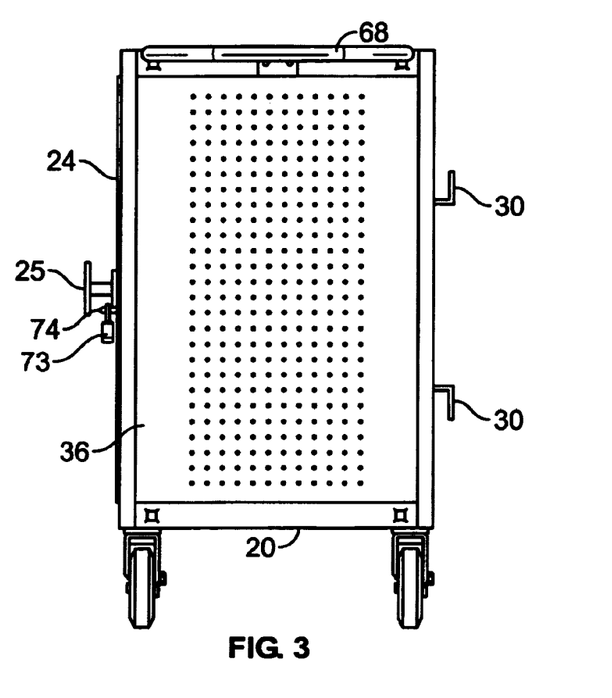
FIG. 3 is a view of the right side of the computer storage cart of FIG. 1.
Figure 4:
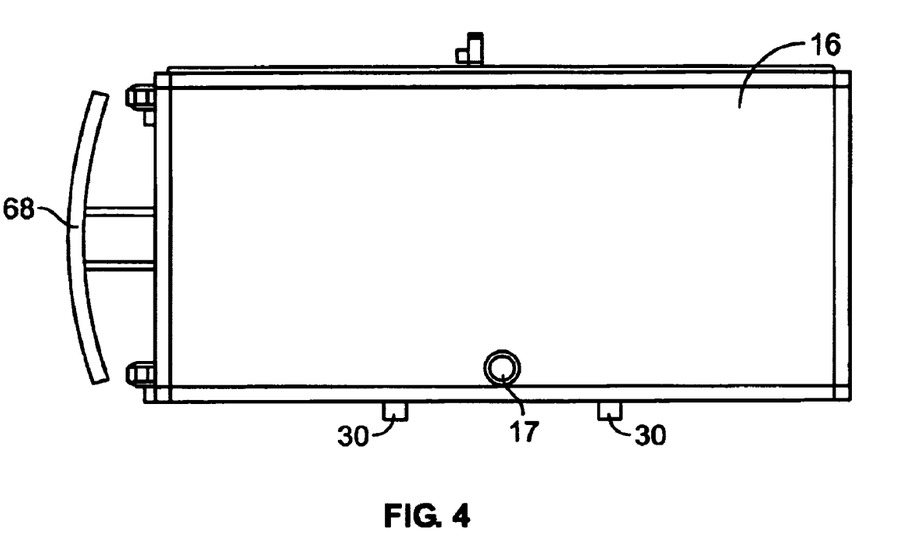
FIG. 4 is a view of the top of the computer storage cart of FIG. 1.
Figure 5:
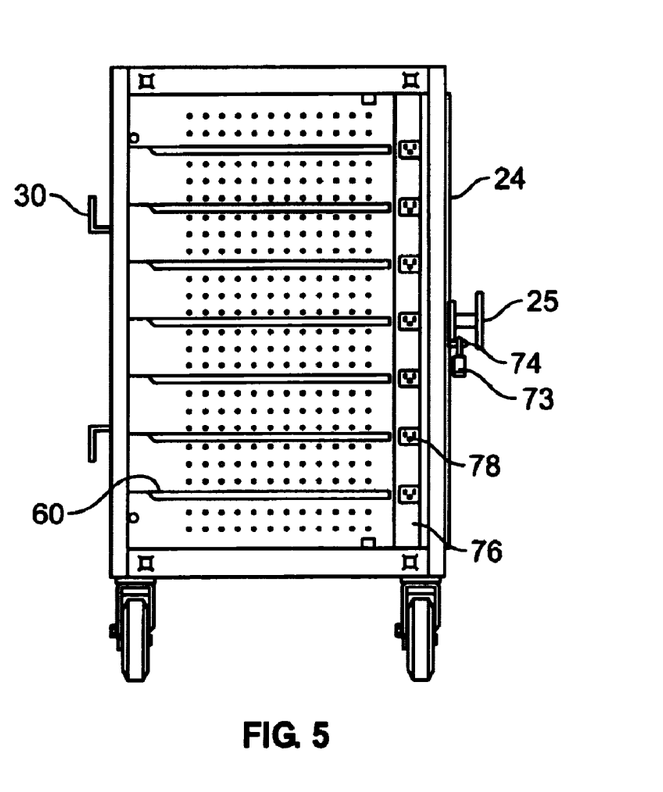
FIG. 5 is a view of the left side of the computer storage cart of FIG. 1 shown with the left side panels removed for clarity.

FIG. 1 is a perspective view of one embodiment of the computer storage cart 10 constructed in accordance with the present invention. FIG. 2 is a front view of the computer storage cart of FIG. 1. In FIGS. 1 and 2, shown is one embodiment of a computer storage cart 10 having a top 16, a bottom 20, a rear panel 28 (best shown in FIG. 5). As shown in FIGS. 3, 4 and 5, one embodiment of the storage cart 10 also has a right inner panel 32 and a right outer panel 36, a left inner panel 40 and a left outer panel 44. In yet other embodiments, cart 10 may have a one panel construction on each the right and left portion of cart 10. Also shown in FIGS. 1 and 3 are doors 24, handle 25 attached to door 24, shelves 60, a handle 68 attached cart 10, electrical units 76, swivel casters 52 and casters 56 attached to bottom 20, leg brackets 64, locking mechanism 72 and a grommet hole 17 incorporated into top 16.

Figure 8:
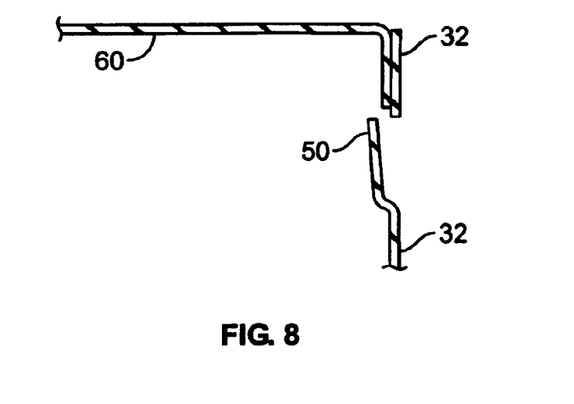
FIG. 8 is a side view of a portion of a shelf shown aligned with a shelf mounting tab of the computer storage cart of FIG. 1.

As best shown in FIG. 5, one embodiment of computer storage cart 10 has grommet holes 29 and cord holder 30 disposed on rear panel 28. Also, as best shown in FIG. 8, shelf mounting tabs 50 may be provided and attached to the right inner panel 32 and the left inner panel 40.

Storage cart 10 may have, in one embodiment, seven shelves 60. Each shelf 60 may store three computers and the bottom 20 may store an additional three computers for a total of 24 computers capable of being stored in cart 10. In yet other embodiments of storage cart 10, there may be more than or less than seven shelves 60. Each shelf 60 may, in other forms of cart 10, store less than or more than three computers. Shelves 60 may attach to the left inner panel 40 and right inner panel 32 by attaching shelves 60 to mounting tabs 50. In yet other embodiments, shelves 60 may be positioned within cart 10 by any other type of fastener or connecting device that would provide for proper operation of cart 10. For example, shelves 60 may be attached to and fixed within cart 10 by screws, pins, bolts and nuts, adhesives or any other fastener and/or connector. Shelf 60 may be constructed of metal, plastic, wood or any other type of material that will provide for proper operation of cart 10 and provide the necessary support for the computers.

In one embodiment of computer storage cart 10, as best shown in FIGS. 1 and 3, cart 10 may have two doors 24 having a locking mechanism 72 and a handle 25 substantially as shown in FIGS. 1 and 3. Doors 24 may be movably connected to cart 10. Doors 24, when in the closed position as shown in FIG. 3, may be secured and locked using lock mechanism 72. In other embodiments of cart 10, there may be one door 24 or two or more doors 24 attached to storage cart 10. In yet other forms of storage cart 10, doors 24 may be slidably connected to cart 10. Doors 24 may be constructed of metal, plastic, wood or any other type of material that will provide for proper operation of cart 10. In yet another embodiment, doors 24 may be three-point locking doors with a padlock loop. As shown in FIG. 1 and FIG. 3, a padlock 73 may be used to secure doors 24 by inserting the padlock 73 into a padlock loop 74. In yet still other embodiments of cart 10, other locking mechanisms may be used to secure doors 24.

As shown in FIGS. 1, 2, 3 and 7, cart 10 may also have swivel casters 52 and casters 56. In one embodiment, cart 10 may have two swivel casters positioned at one end of cart 10 and may have two non-swivel casters 56 positioned at the opposite end of cart 10. In yet other embodiments, cart 10 may have any number of casters 56 and swivel casters 52 located in any position and attached to cart 10. As shown in FIGS. 1 and 5, swivel casters 52 and casters 56 may be mounted to the bottom 20. Casters 52 and 56 may further have a locking mechanism which when locked will prevent the casters 52 and 56 from moving and thereby maintain cart 10 in a fixed location.

Doors 24, rear panel 28, right inner panel 32, right outer panel 36, left inner panel 40, left outer panel 44, top 16 and bottom 20 may have a plurality of holes 46. Holes 46 provide ventilation for cart 10 so that the heat generated by the recharging of the devices stored in cart 10 will dissipate through holes 46. In yet other embodiments of cart 10, slots or other configurations may be used to provide for ventilation of cart 10.

Figure 6:
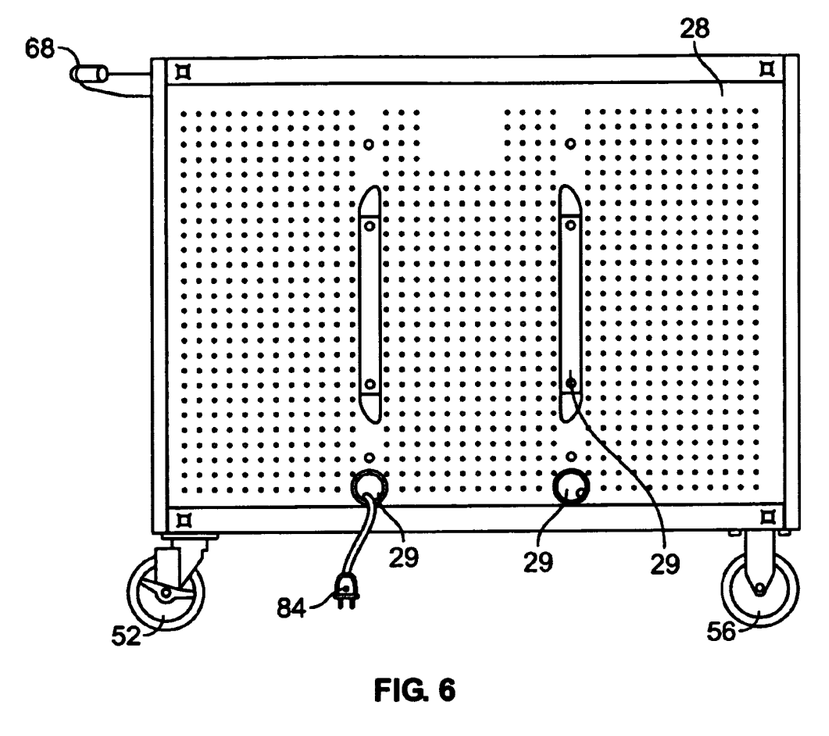
FIG. 6 is a view of the rear portion of the computer storage cart of FIG. 1.
Figure 7:
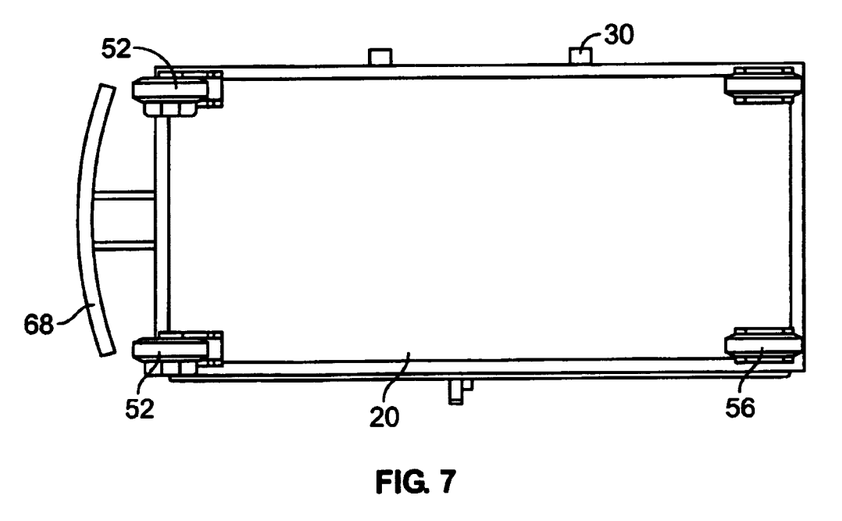
FIG. 7 is a view of the bottom of the computer storage cart of FIG. 1.

As shown in FIGS. 1 and 6, holes 17 may be provided in top 16 and/or rear panel 28 to provide for a power supply cord to easily and conveniently be passed through the holes 17 and into or out of cart 10. In yet other embodiments of cart 10, holes 17 may be positioned and located in right outer panel 36, left inner panel 40, right inner panel 32, left outer panel 44 and/or bottom 20. As shown in FIG. 3 and FIG. 5, a cord holder 30 may be attached to rear panel 27. In yet other embodiments of cart 10, cord holders 30 may be provided on any other portion of cart 10, such as for example, on right outer panel 36 and/or left outer panel 44.

Top 16, bottom 20, rear panel 28, right inner panel 32, right outer panel 36, left inner panel 40, left outer panel 44 may be attached to leg brackets 64 as shown in FIGS. 1, 2, 3 and 4. Connecting devices such as screws, pins, bolts and nuts, adhesives, or any other connecting means or device may be used to attach the various components to leg brackets 64.

As shown in FIGS. 1 and 2, storage cart 10 may have a handle 68 attached to storage cart 10. As shown in FIG. 1, in one embodiment, handle 68 may be attached to the right side of storage cart 10. In yet other embodiments, handle 68 or more than one handle 68 may be attached to cart 10 anywhere on cart 10 that will provide for ease of use of cart 10 by a user. To move cart 10, a user would grab handle 68 and either pull or push cart 10 in a direction that the user wanted to move cart 10. For example, a user may wish to move computer cart 10 from one room to another room.

As shown in FIGS. 1 and 6, storage cart 10 may have one or more electrical units 76. In one embodiment, electrical units 76 may each have electrical receptacles 78 and an electrical cord 84. In yet other embodiments, electrical units 76 may have a circuit breaker 80 and/or an on-off power switch 82. As shown in FIG. 1 each electrical unit 76, in one form, has fourteen electrical receptacles 78 (seven receptacles 78 on opposite sides of unit 76). Electrical units 76, as best shown in FIGS. 1 and 2, are positioned in front of shelves 60 to provide easy user access to the electrical receptacle 78. As shown in FIG. 1, electrical units 76 are positioned adjacent shelves 60 and doors 24. When a user places a computer or other device 12 on a shelf 60 within cart 10, the computer's electrical cord for recharging is easily inserted into the corresponding electrical receptacle 78. As shown in FIG. 6, in one form of cart 10, cord 84 of electrical unit 76 may pass through grommet hole 29 disposed in rear panel 28. Cord 84 may then be connected to an external power source rated for the appropriate voltage. FIG. 1 shows electrical units 76 having electrical receptacles 78 facing toward left inner panel 40 and right panel 32. In other embodiments of cart 10, electrical receptacles 78 may be disposed on electrical units 76 so that electrical receptacles 78 face only to the left side of cart 10, only the right side of cart 10, only the doors 24 and/or only the rear panel 28. Electrical receptacles 78 may be positioned and disposed on electrical units 76 in any order and in any combination and on any side of electrical unit 76 that is required for the particular application of storage cart 10. In one form of cart 10, as shown in FIG. 1, electrical unit 76 may have fourteen electrical receptacles on each unit 76. In yet other embodiments of cart 10, any number of electrical receptacles 78 may be disposed on electrical unit 76. In one form of cart 10, electrical unit 76 may be attached at one end to top 16 and attached at the opposite end to bottom 20. Many different types of fasteners and connecting devices and/or adhesives may be used to position and securely or removably fix electrical unit 76 within cart 10. For example, screws, nuts and bolts, pins and other fastening devices may be used to fix electrical unit 76 to storage cart 10.

Figure 12:
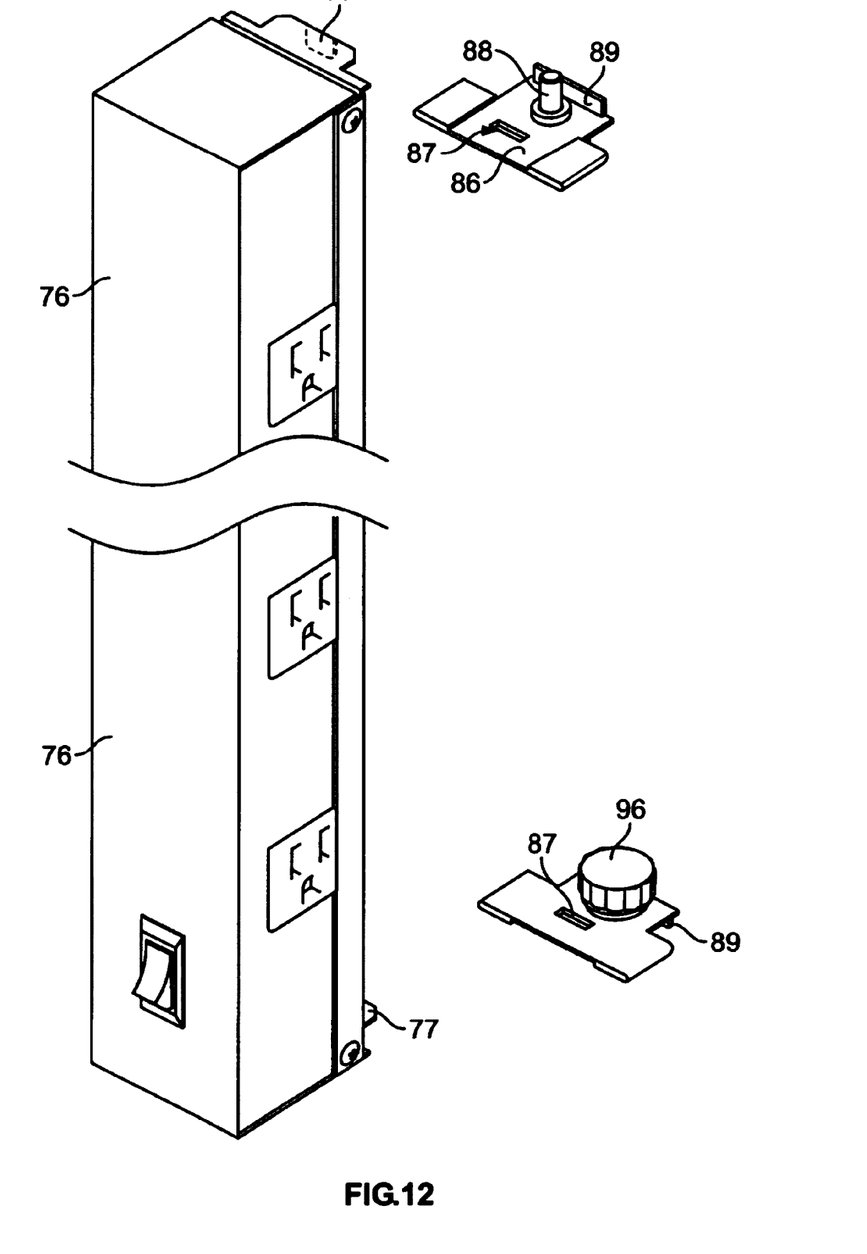
FIG. 12 is a partial front perspective view of an alternate embodiment of the outlet electrical unit and means for attaching the electrical unit to the computer storage cart.

In one embodiment, as shown in FIG. 12, connectors 86 may be provided to attach electrical units 76 to cart 10. Connectors 86 have a slot or hole 87, a pin or threaded portion 88, a tab 89 and a knob 96. In this embodiment, electrical units 76 may have tab 77. In use, connector 86 would be aligned with the corresponding receiving elements in cart 10, top 16 and bottom 20. Pins or screws 88 are received by bottom 20 at a hole in bottom 20. Tabs 77 are received by slots or holes 87 and tabs 89 are received by holes or slots positioned in bottom 20 and top 16.

In use, storage cart 10 may be used in a variety of different locations and applications. For example, storage cart 10 may be used in offices, schools, community facilities, and anywhere else that secure computer storage and recharging capabilities are necessary. A user may open doors 24 and insert a computer or computers 12 or other device onto a shelf 60. A user would then insert the computer's electrical charging cord into the desired electrical receptacle 78 located on electrical units 76. If electrical unit 76 contains an on-off power switch 82, a user can select between the desired switch setting. The user may insert as many computers 12 into cart 10 in position on shelf 60 as cart 10 is designed to hold. The user may then shut and lock doors 24. If storage cart 10 contains a lock mechanism 72 or other appropriate locking device, the user may then lock doors 24 to prevent access to the computers 12 being recharged within storage cart 10 from unauthorized access. The user may desire to move cart 10 to another location or another room while the computers 12 are located within cart 10. The user would simply disconnect electrical unit 76, cord 84 from the external power source and wrap cord 84 around cord holder 30 for secure storage of cord 84. The user may then simply push or pull handle 68 to steer cart 10 to the desired location. Once cart 10 is in place in a new location, the user may lock casters 56 and swivel casters 52 so the cart does not roll if someone leans against the cart. Cord 84 may then be unwrapped to the desired length from cord holder 30 and cord 84 may then be connected to the appropriate power source. While the computers 12 stored inside locked cart 10 are being charged, they will have a tendency to generate heat during the charging process. This heat may escape through ventilation holes 46 located in cart 10.

Figure 9:
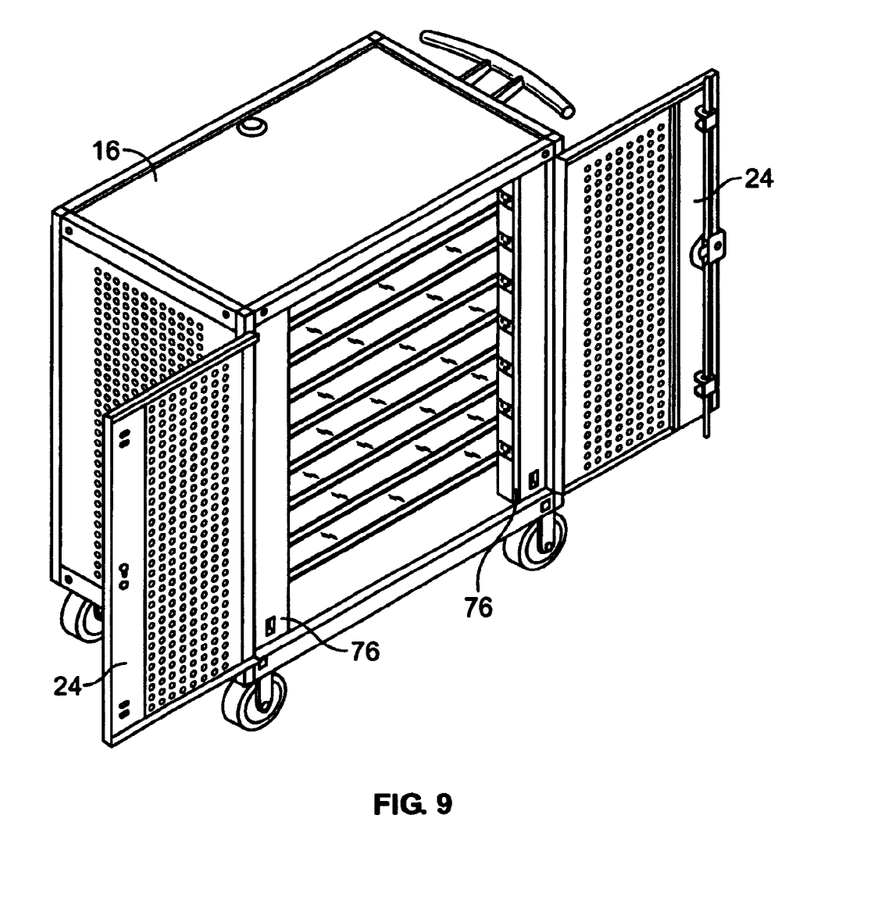
FIG. 9 is a front perspective view of an alternate embodiment of the computer storage cart.
Figure 10:
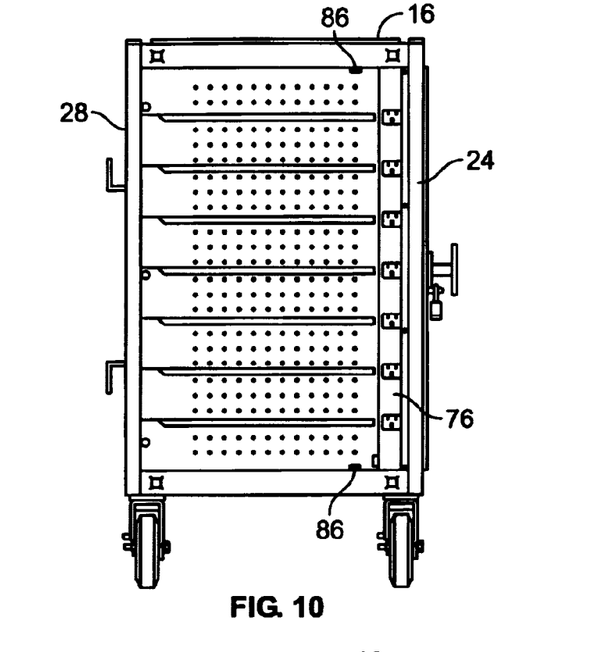
FIG. 10 is a view of the left side of the computer storage cart of FIG. 9 shown with the left side panels and the left side outlet electrical unit removed for clarity.

FIG. 9 is a front perspective view of an alternate embodiment of the computer storage cart. FIG. 10 is a view of the left side of the computer storage cart of FIG. 9 shown with the left side panels and the left side electrical unit 76 removed for clarity. As shown in FIGS. 9 and 10, in one embodiment, the electrical units 76 may be positioned at the right side and left side of cart 10 substantially as shown in FIGS. 9 and 10.

Figure 11:
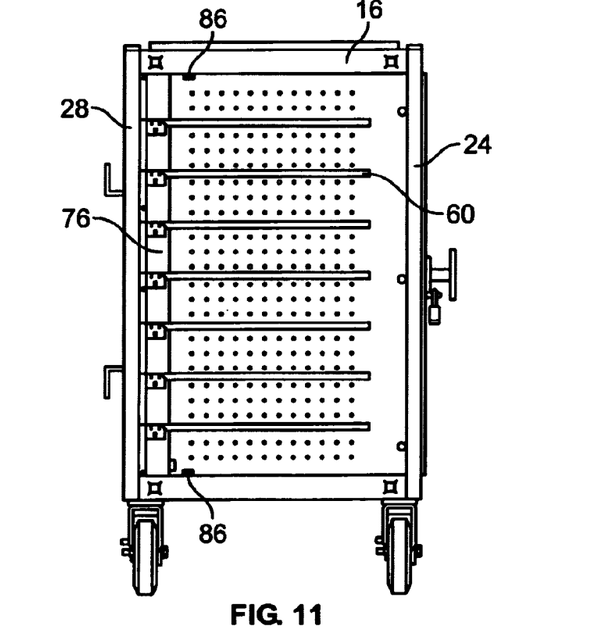
FIG. 11 is a view of the left side of another alternate embodiment of the computer storage cart shown with the left side panels and the left side outlet electrical unit removed for clarity.

FIG. 11 is a left side view of another alternate embodiment of the computer storage cart shown with the left side panels and the left side electrical unit 76 removed for clarity. As shown in FIG. 11, in one embodiment, the electrical units 76 may be positioned at the rear of cart 10 adjacent the rear panel 28. In this embodiment, a portion of shelves 60 may be removed to provide for positioning of electrical units 76. In yet other embodiments, shelves 60 may be provided in shorter lengths that do not extend to the rear panel 28 but instead extend only to the front most edge of electrical units 76.

In yet other uses, cart 10 may be used to store and/or recharge many different of types of devices in addition to computers. For example, personal digital assistants (PDA) have become commonly used in a variety of different settings. In this application of cart 10, a personal digital assistant would simply be placed on an appropriate shelf 60 and plugged into the appropriate electrical receptacle 78. Other devices that may contain battery packs or rechargeable batteries may also be placed into cart 10 on shelves 60 to provide for secure, ventilated storage of the devices while they are recharging within cart 10.

Specific embodiments of novel methods and apparatus for construction of novel computer storage carts according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claims herein.

What is claimed is:

1. A storage cart for rechargeable equipment, said storage cart comprising:
    an interior space defined by a top portion and a bottom portion joined to spaced apart opposing sidewalls and a back portion;
    a plurality of vertically spaced apart shelves located in said interior space for holding the rechargeable equipment;
    at least one door to secure said interior space; and
    at least one electrical unit attached to the cart and having a plurality of electrical receptacles, said at least one unit being positioned such that it is generally perpendicular to and spans generally between the bottom portion and the top portion of said storage cart, adjacent and generally perpendicular to the shelves such that each shelf is provided access to at least one of said electrical receptacles at a point adjacent the shelf, the at least one electrical unit being located proximate the at least one door.

2. The storage cart of claim 1 further comprising a plurality of wheels attached to the bottom portion.

3. The storage cart of claim 2 wherein the plurality of wheels comprise two swivel caster wheels positioned at one end of the cart and two non-swivel caster wheels positioned at a second end of the cart.

4. The storage cart of claim 1 further comprising a handle attached to the cart.

5. The storage cart of claim 1 wherein the back portion has at least one aperture therethrough.

6. The storage cart of claim 1 wherein the back portion, opposing sidewalls and the at least one door have ventilation holes.

7. The storage cart of claim 1 wherein the at least one electrical unit has an on-off power switch.

8. The storage cart of claim 1 further comprising a means for locking the at least one door to secure the interior space.

9. A storage cart for rechargeable equipment, said storage cart comprising:
    a cabinet defining an interior space;
    a plurality of doors attached to the cabinet for closing said interior space;
    a plurality of spaced apart shelves located in said cabinet interior space for holding the rechargeable equipment; and
    at least one electrical unit attached to the cart and having a plurality of electrical receptacles, said at least one unit being positioned such that it is generally perpendicular to and spans generally between the bottom portion and the top portion of said storage cart, adjacent and generally perpendicular to the shelves such that each shelf is provided access to at least one of said electrical receptacles at a point adjacent the shelf, the at least one electrical unit being located proximate the at least one door.

10. The storage cart of claim 9 further comprising a plurality of wheels attached to the cabinet.

11. The storage cart of claim 10 wherein the plurality of wheels comprise two swivel caster wheels positioned at one end of the cabinet and two non-swivel caster wheels positioned at a second end of the cabinet.

12. The storage cart of claim 9 further comprising a handle attached to the cabinet at one end.

13. The storage cart of claim 9 wherein the cabinet has at least one aperture therethrough.

14. The storage cart of claim 9 wherein the cabinet has a plurality of ventilation holes.

15. The storage cart of claim 9 wherein at least one electrical unit has an on-off power switch.

16. The storage cart of claim 9 further comprising a means for locking the two doors to secure the interior space.

17. A storage cart for rechargeable computer equipment, said storage cart comprising:
- a cabinet defining an interior space;
- at least one door attached to the front of said cabinet for securing said interior space;
- a plurality of shelves located in said cabinet interior space for holding the rechargeable computer equipment;
- at least one electrical unit attached to the cart and located within the interior space between the plurality of shelves and the at least one door located in the front of said cabinet; and a plurality of electrical receptacles positioned on the at least one electrical unit and proximate at least one shelf having a plurality of electrical receptacles, said at least one unit being positioned such that it is generally perpendicular to and spans generally between the bottom portion and the top portion of said storage cart, adjacent and generally perpendicular to the shelves such that each shelf is provided access to at least one of said electrical receptacles at a point adjacent the shelf.

18. The storage cart of claim 17 further comprising a plurality of wheels attached to the cabinet.

19. The storage cart of claim 17 wherein the at least one electrical unit further comprises an on-off power switch.

20. The storage cart of claim 19 wherein the at least one electrical unit further comprises a circuit breaker.

21. A storage cart for use with laptop computers, the storage cart comprising:
- an interior space defined by a ceiling and a floor joined to spaced apart opposing sidewalls and a back wall;
- a plurality of vertically spaced apart shelves located in the interior space for holding the laptop computers in individual protected areas;
- a first door and a second door to secure the interior space; and
- at least one electrical unit attached to the cart and having a plurality of electrical receptacles, the at least one unit being positioned such that it is generally perpendicular to and spans generally between the floor and the ceiling of the storage cart, adjacent and generally perpendicular to the shelves such that each shelf is provided access to at least one of the electrical receptacles at a point adjacent the shelf, the at least one electrical unit being located
- proximate at least one of the first or second door; whereby the laptop computers are kept safe and are provided electricity for recharging while in the storage cart.

* * * * *